US012422118B2

(12) United States Patent
Mügge

(10) Patent No.: US 12,422,118 B2
(45) Date of Patent: Sep. 23, 2025

(54) LIGHTING DEVICE, LIGHTING SYSTEM AND MOTOR VEHICLE

(71) Applicant: Hella GmbH & Co. KGaA, Lippstadt (DE)

(72) Inventor: Martin Mügge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/651,173

(22) Filed: Apr. 30, 2024

(65) Prior Publication Data

US 2024/0377040 A1 Nov. 14, 2024

(30) Foreign Application Priority Data

May 10, 2023 (DE) ......................... 102023112233.9

(51) Int. Cl.

*F21S 41/153* (2018.01)
*F21S 41/143* (2018.01)
*F21S 41/20* (2018.01)
*F21S 41/36* (2018.01)

(52) U.S. Cl.

CPC ........... *F21S 41/153* (2018.01); *F21S 41/143* (2018.01); *F21S 41/285* (2018.01); *F21S 41/36* (2018.01)

(58) Field of Classification Search

CPC ...... F21S 41/153; F21S 41/143; F21S 41/285; F21S 41/36

See application file for complete search history.

(56) References Cited

U.S. PATENT DOCUMENTS

| | | | | |
|---|---|---|---|---|
| 4,733,335 | A * | 3/1988 | Serizawa | F21V 29/83 362/547 |
| 9,896,023 | B1 * | 2/2018 | Salter | F21S 43/255 |
| 2013/0271999 | A1 | 10/2013 | Shiobara et al. | |
| 2020/0292150 | A1 * | 9/2020 | Lai | H05K 1/181 |

FOREIGN PATENT DOCUMENTS

| | | | |
|---|---|---|---|
| DE | 202010008219 | U1 | 12/2010 |
| DE | 112012002410 | T5 | 4/2014 |
| DE | 102016119326 | A1 | 4/2018 |
| DE | 102017120532 | A1 | 3/2019 |

* cited by examiner

*Primary Examiner* — Elmito Breval

(74) *Attorney, Agent, or Firm* — Husch Blackwell LLP

(57) ABSTRACT

A lighting device for a motor vehicle with a printed circuit board populated with numerous light-emitting diodes, an optical panel, and a reflector element between the printed circuit board and the optical panel. The reflector element is subdivided into numerous segments. Each light-emitting diode is dedicated to a segment, such that light emitted from the light-emitting diodes is reflected by the segments of the reflector element and passes through the optical panel. Each segment of the reflector element has a reflector foot. The reflector foot surrounds the respective light-emitting diode, and is in contact with the printed circuit board at a contact surface.

16 Claims, 7 Drawing Sheets

LIGHTING DEVICE, LIGHTING SYSTEM AND MOTOR VEHICLE

CROSS REFERENCE

This application claims priority to German Application No. 10 2023 112233.9, filed May 10, 2023, the entirety which is hereby incorporated by reference.

FIELD OF THE INVENTION

The invention relates to a lighting device, a lighting system, and a motor vehicle.

BACKGROUND OF THE INVENTION

The design of a pixeled or segmented display from a lamp or lighting device on a motor vehicle is used to obtain a desired light signature or display additional information (e.g. numerals, texts, pictograms) by activating individual segments or pixels. New content or light signatures may be developed over the lifetime of the vehicle that can be offered to the owner or driver of the vehicle, without having to develop a new light.

DE 10 2016 119 326 A1 discloses a lighting device of this type.

There are LED displays containing a matrix of RGB-LEDs in the prior art, which are primarily used in advertising and video displays for trade fairs and concerts. The RGB-LEDs are not very bright, for which reason they cannot be used in the automotive industry to obtain the required brightness with a limited number of LEDs. Moreover, these LED displays are controlled with video interfaces, e.g. HDMI, which are not used in automobiles because these video signals cannot be used for lamps and lighting functions. The pixeled arrangement of light-emitting diodes in a matrix is also a disadvantage of these LED panels. The viewer sees a bright spot at each LED, and a clear image can only be obtained at close range when the LEDs are very close together, to obtain a high resolution. This is why adjacent light-emitting diodes in these LED panels currently must be closer than 2 mm, or even 1 mm or less, to one another.

To obtain the legally required minimum brightnesses of 4 cd for red tail lights, 50 cd (ECE) or 130 cd (SAE) for yellow turn signals, and 60 cd (ECE) or 80 cd (SAE) for red brake lights, LEDs with higher operating currents and luminous fluxes must be used, which also satisfy specifications for the automotive industry, as well as optical systems that make optimal use of the luminous flux in LEDs, in order to be able to generate a brake light or turn signal with fewer pixels or segments, and to be able to obtain different light signatures with the existing displays.

BRIEF SUMMARY OF THE INVENTION

The object of the invention is to create a better lighting device than that offered by the prior art, in particular with a simple and inexpensive distinction of adjacent light- emitting diodes, and a uniform lighting by the lighting device, which still has a compact structure, in particular with regard to its thickness, or depth.

These problems are solved by a lighting device, a lighting system, and a motor vehicle as shown and described herein. Other features and details of the invention can be derived from the dependent claims, the description, and the drawings. Features and details described in conjunction with the lighting device according to the invention also apply to the lighting system according to the invention, and/or the motor vehicle according to the invention, and vice versa, such that reference can be and is made to the individual aspects of the invention in this regard.

The first aspect of the invention relates to a lighting device for a motor vehicle, which contains a printed circuit board populated with numerous light-emitting diodes, an optical panel, and a reflector element that is placed between the printed circuit board and the optical panel and is subdivided into numerous segments, each of which has a dedicated light-emitting diode, the light from which is reflected by the segments of the reflector element and passes through the optical panel. Each segment of the reflector element has a reflector foot that surrounds the respective light-emitting diode and comes in contact with the printed circuit board at a contact surface.

Because the reflector foot of the reflector element segment comes in contact with the printed circuit board, the openings that were formed in the reflectors of the prior art are closed off, i.e. there are no gaps between the segments and the printed circuit board. This also results in a more robust lighting device, because the reflector element is braced against the printed circuit board by the reflector foot. The contact surface can be flat. The printed circuit board and reflector foot can also be bonded to one another at the contact surface by an adhesive, or mechanically attached with clips.

The reflector foot is opaque, such that light from the light-emitting diode cannot enter adjacent segments, thus increasing the contrast between a segment that is lit and an adjacent segment that is not lit. The reflector foot also diffuses the light from the light-emitting diode toward the optical panel, thus increasing the brightness of the lit segment and the efficiency of the lighting device. In this manner, the light emitted laterally from the light-emitting diode is made use of in a simple manner.

The reflector foot on a segment, or the reflector feet on segments, can be used to position the reflector element on the printed circuit board and around the (respective) light-emitting diodes. The reflector foot can also be used to define the spacing between segments, or the reflector element, and the light-emitting diodes. This spacing defines the diffusion or the result brightness.

In order to save weight, the reflector feet can be notched on the outside, where they are not exposed to the light from the light-emitting diodes.

The reflector element, and therefore the reflector feet for the respective segments, with or without notches, can be readily produced in an injection molding process.

Numerous segments can be arranged in rows and columns in the reflector element. This arrangement of the segments can be effectively used to display a wide variety of light signatures.

In the framework of the invention, it may be advantageous for the reflector foot to be circular, such that it surrounds the respective light-emitting diode concentrically.

This improves the reflection and diffusion of the light from the light-emitting diodes toward the optical panel. This circular design of the reflector foot and its concentric placement results in a uniform reflection and diffusion that is comparatively bright due to the small spacing therebetween.

The reflector foot has at least one radius. The radius, or smallest radius, of the reflector foot determines the spacing to the light-emitting diode. This should be at least 110%, preferably 130%, more preferably 150% of the maximum length or diameter of the light-emitting diode.

In the framework of the invention, the reflector foot can have a plateau that is parallel to the printed circuit board.

This plateau acts as a reinforcemenet and simplifies the contact or connecting to the printed circuit board. Seen lengthwise, the plateau can be 0.5 to 1.5, preferably 0.7 to 1.2, more preferably 0.8 to 1.1 times the length of the contact surface.

In the framework of the invention, there can be an optical surface between the contact surface and the plateau that reflects the light from the light-emitting diode.

The light from the light-emitting diode can be reflected or diffused by the optical surface into the interior or directly toward the optical panel. Because of the position of the optical surface, very little brightness of the light-emitting diode is lost before it is reflected or diffused. This optical surface further increases the efficiency of the lighting device.

The optical surface can also be an angle of 35° to 65°, preferably 40° to 60°, more preferably 45° to 55°, to the contact surface.

The optical surface forms a surrounding truncated cone, and deflects the light from the light-emitting diode toward the optical panel. This truncated cone design results in a homogenous reflection and diffusion of the light from the light-emitting diode, making optimal use thereof.

The reflector foot and the segment of the reflector element can also be produced as an integral part.

This can be achieved particularly easily with injection molding, with which it is particularly easy to obtain the transition from the circular reflector foot to the non-circular part of the segment, or a change in the dimensions thereof. The segment and the reflector foot are advantageously made of the same material, and/or have the same surface quality, resulting in the same reflective and diffusion behavior.

In the framework of the invention, it is also possible for the ratio of the height of the light-emitting diode to the height of the reflector foot to be 1:1 to 1:3, preferably 1:1.5 to 1:2.5, more preferably 1:1.75 to 1:2.25.

This has a positive effect on the diffusion in the region of the light-emitting diode, thus resulting in increased brightness of the lighting device.

The ratio of the height of the plateau, i.e. the spacing between the plateau and the printed circuit board, to the height of the reflector foot can be 0.2:1 to 0.9:1, preferably 0.4:1 to 0.8:1, more preferably 0.5:1 to 0.7:1. Consequently, the height of the optical surface, and therefore its reflective property, can be adjusted and optimized to the desired brightness of the lighting device.

In the framework of the invention, the light-emitting diode can emit light radially.

With light-emitting diodes that emit light radially, it is advantageous when the distance the light travels to the reflector element, or wall elements, is comparatively short. This results in a comparatively compact lighting device for a motor vehicle. In particular, the lighting device can be comparatively thin, in particular in the direction extending from the printed circuit board toward the optical panel. In particular, the light-emitting diodes that emit light radially can be oriented such that they emit light radially outward from their circumference. This means that light is emitted not only, or not primarily, from the front of each light-emitting diode, as is the case with an LED that only emits light from the end. It is decisive that light is also (in particular, mainly) emitted radially from the circumference of the light-emitting diodes. The circumference of the light-emitting diodes is understood to be the sides thereof, which typically extend diagonally, specifically orthogonally, in relation to the end. In other words, the circumference is between the front and back ends of the light-emitting diode. In particular, light-emitting diodes that emit light radially can be designed such that light is emitted radially outward over at least half of their circumference, or substantially along the entire circumference. In other words, light can be emitted radially outward over at least half, most of, or substantially the entire, circumference, or in other words, annularly, from each of the light-emitting diodes.

Combining light-emitting diodes that emit light radially with the reflector foot increases the brightness of the lighting device. The reflector foot can reflect the light emitted radially directly toward the optical panel, such that use can be made directly of the brightness thereof. This increases the available brightness, and thus the efficiency of the lighting device.

In the present invention, the segments can have a rectangular segment surface.

The rectangular segment surface is dedicated to the optical panel.

The segment of the reflector element thus has a length and a width that are symmetrical in relation to the circular reflector foot. This means that the segment expands from the circular reflector foot to form a rectangular segment surface.

The length or the width can be parabolic. The length and width can also both be parabolic, resulting in a paraboloid segment, in particular forming a spherical calotte.

The width to length ratio of the rectangular segment can be from 1:1 to 1:4, preferably 1:1.5 to 1:3, more preferably 1:2 to 1:2.5.

This makes it particularly easy to generate the desired light signals. This also ensures that the legally required minimum brightnesses in the automotive field of 4 cd for a red tail light, 50 cd (ECE) or 130 cd (SAE) for a yellow turn signal, and 60 cd (ECE) or 80 cd (SAE) for a red brake light can still be satisfied.

It may be advantageous in the framework of the invention if the reflector element is mirrored and/or sputtered, and/or has a diffusion lens, in particular with pillow-shaped or striped structures.

This allows the reflection or diffusion of the light from the light-emitting diodes to be adjusted to the desired brightness, or to the length to width ratio. It is also conceivable to place the lenses, or additional lenses, such that the light from the light-emitting diodes is focused or diffused.

In the framework of the invention, the reflector element can have a diffractive diffusion structure, microstructure, or scattering structure.

In the simplest case, the microstructure can be formed through erosion, etching, or with a laser. The means of obtaining the structure depends on the material from which the reflector element is made and/or the desired brightness of the lighting device. The beam path of the light from the light-emitting diode can be positively affected in this manner.

The optical panel can also have optical diffusion elements on the front and/or back. Optical diffusion elements can be formed by pillow-shaped structures or micro-optics, or a diffractive diffusion structure or microstructure, or in the simplest case, from an erosion structure or etched structure. These structures can further optimize the light that is reflected or diffused by the segments of the reflector element and/or the optical surface of the reflector foot to obtain a homogenous light emitted by the lighting device.

According to another aspect of the invention, the object specified in the introduction is achieved by a lighting system for a motor vehicle that contains a lighting device according to the first aspect of the invention, and a control unit for a light signature display obtained with the lighting device.

The lighting device can be controlled, in particular in a variable manner, by the control unit, or the electronics, to display a variety of content, e.g. individual pictograms and symbols, e.g. traffic signals or auxiliary symbols in traffic, such as an arrow pointing toward the right, a direction arrow, images of passers-by, etc. This content, which can be displayed by activating numerous light-emitting diodes, or lighting the segments to which they are dedicated, is what is understood in the context of this application to be light signatures. These light signatures can be stationary or animated, i.e. not changing over time, or changing over time.

In particular, the lighting system can contain numerous lighting devices according to the first aspect of the invention. The control unit can be configured to control at least two of these lighting devices to display a single light signature.

A single light signature is understood in the present context to mean that the light signatures of the at least two lighting devices are coordinated such that they display the same, or coordinated, content.

According to a third aspect of the invention, the object specified in the introduction is achieved by a motor vehicle that has a lighting device according to the first aspect of the invention, or a lighting system according to the second aspect of the invention.

Advantages that are described for the lighting device for a motor vehicle according to the first aspect of the invention apply in the same manner to the lighting system for a motor vehicle according to the second aspect of the invention, and the motor vehicle according to the third aspect of the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
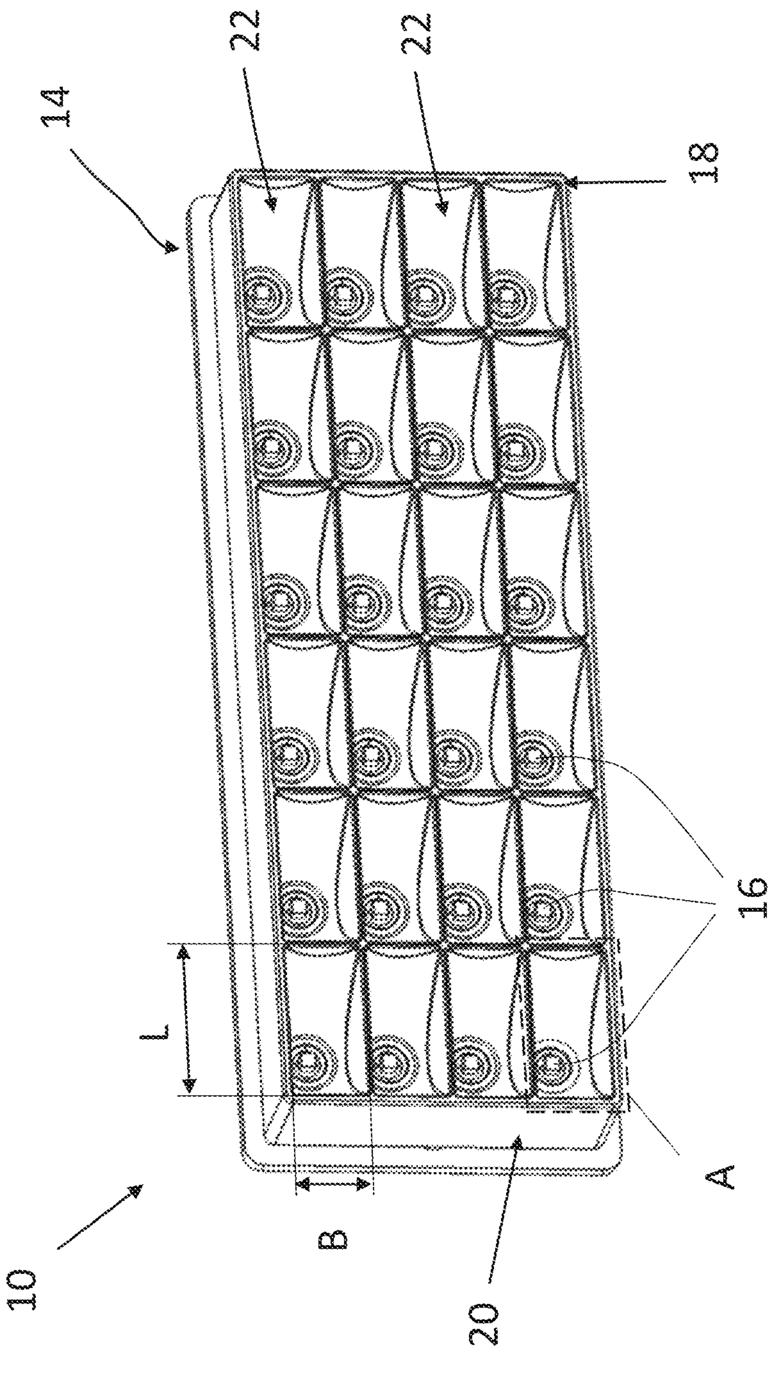
FIG. 1 shows a isometric schematic illustration of a lighting device.
Figure 2:
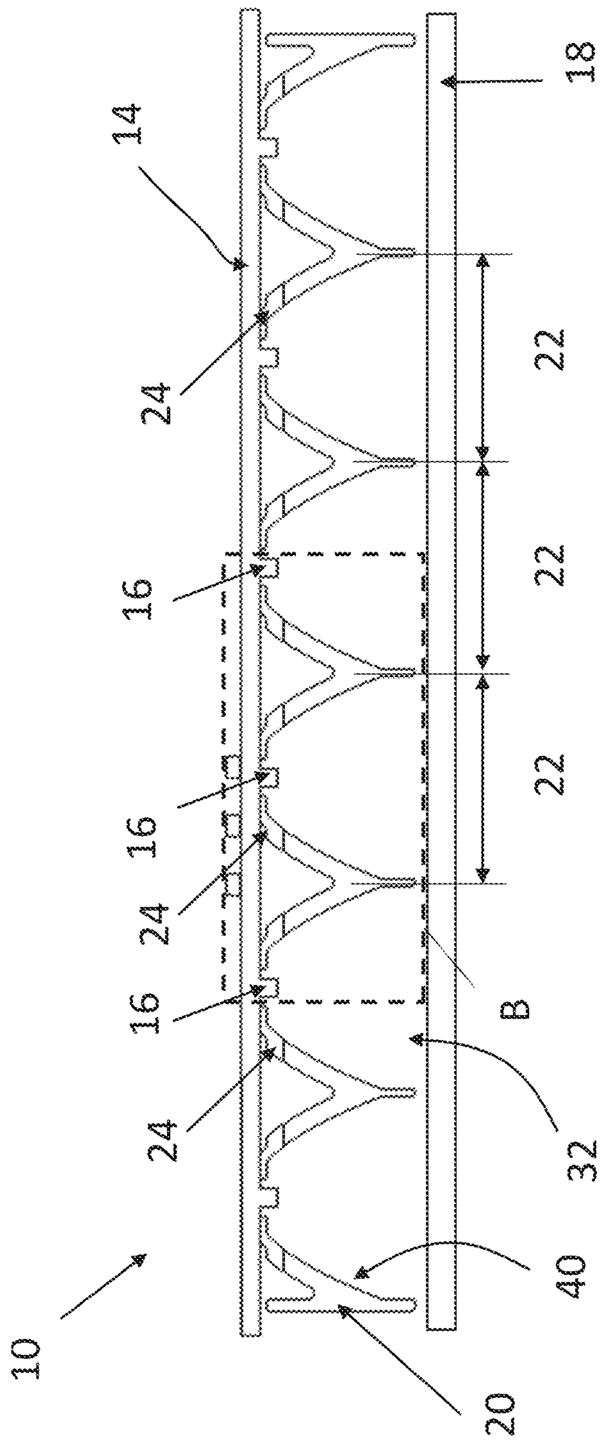
FIG. 2 shows a longitudinal section of a schematic illustration of the lighting device.
Figure 3:
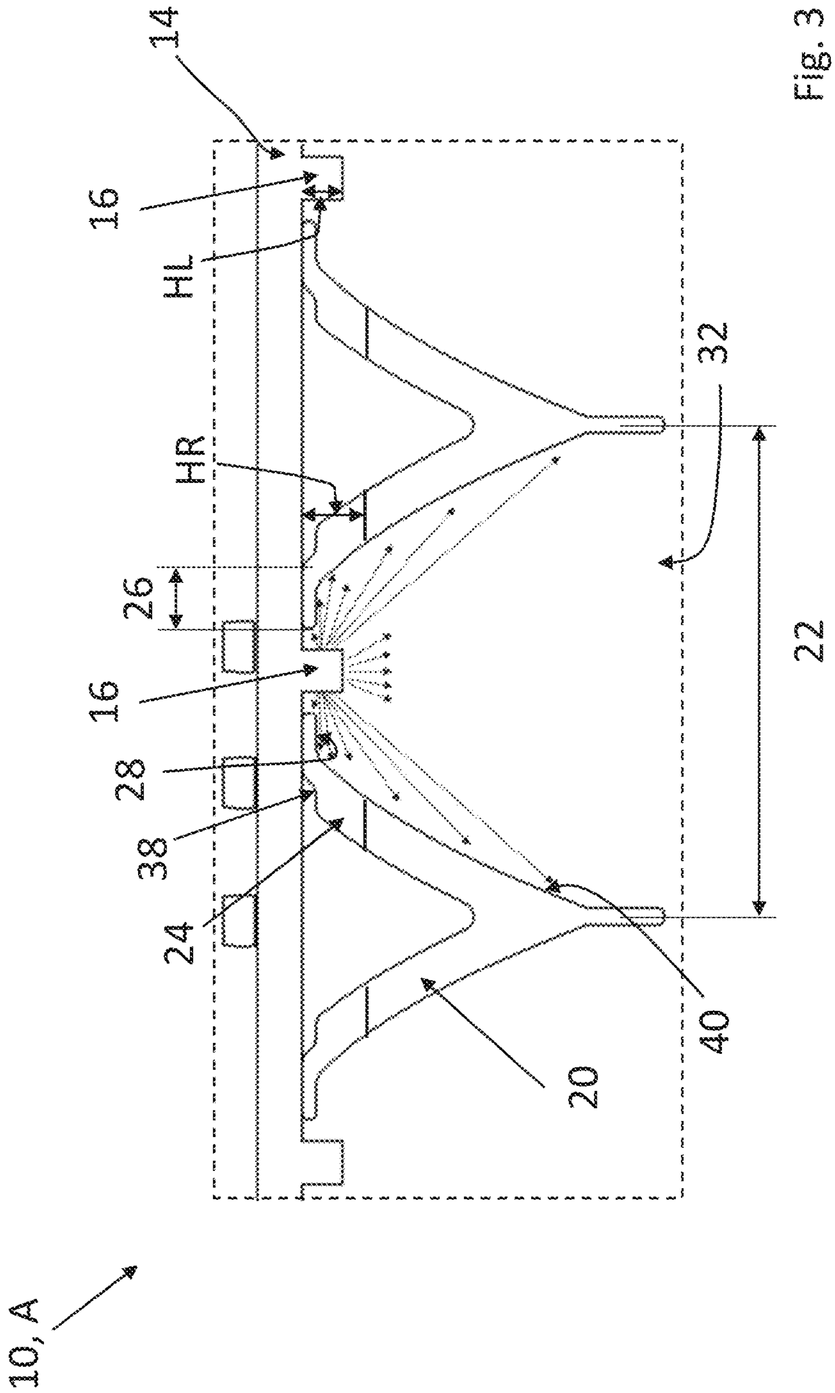
FIG. 3 shows a schematic illustration of a reflector element in a first exemplary embodiment of the lighting device.
Figure 4:
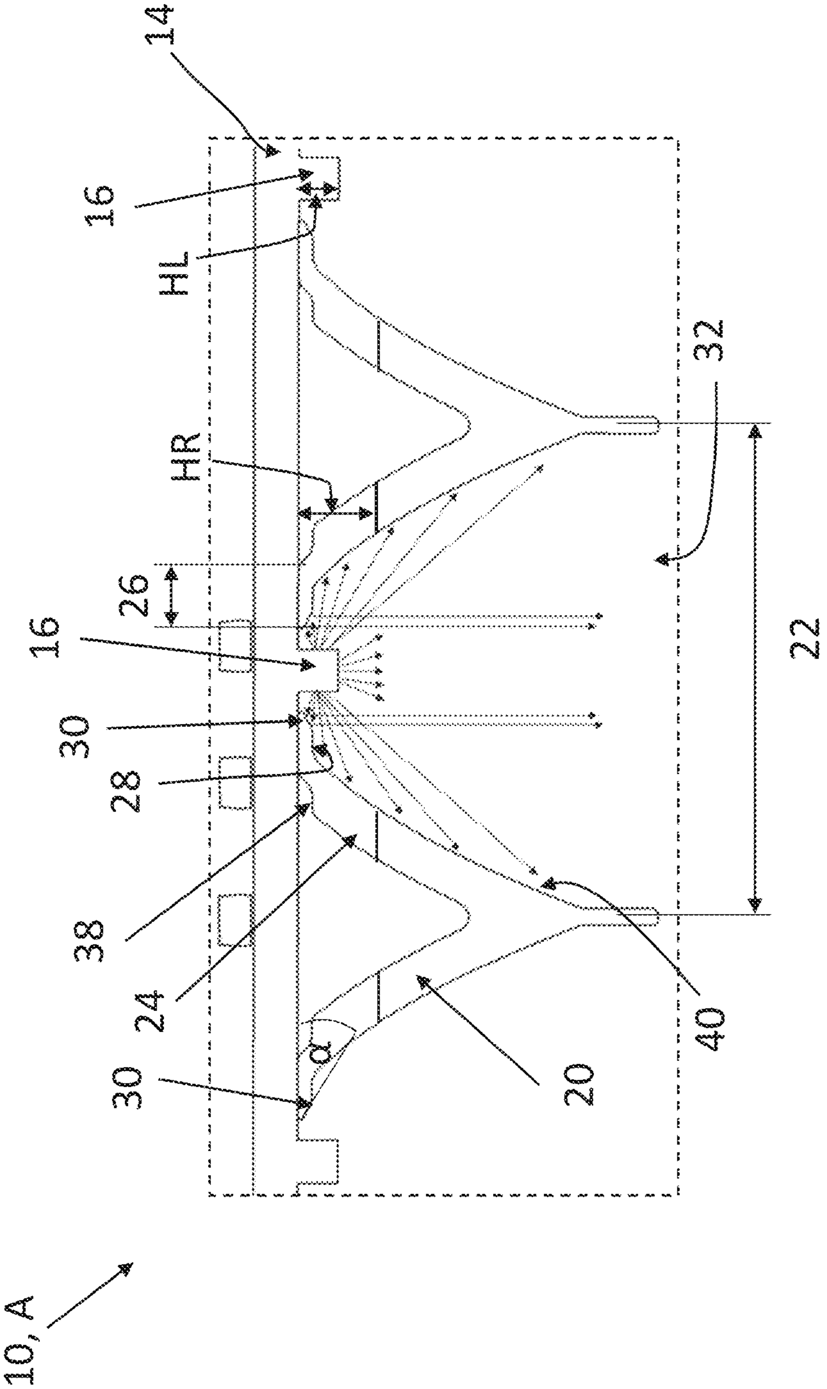
FIG. 4 shows a detail of the longitudinal section of a schematic illustration of a reflector element in a second exemplary embodiment of the lighting device.
Figure 5:
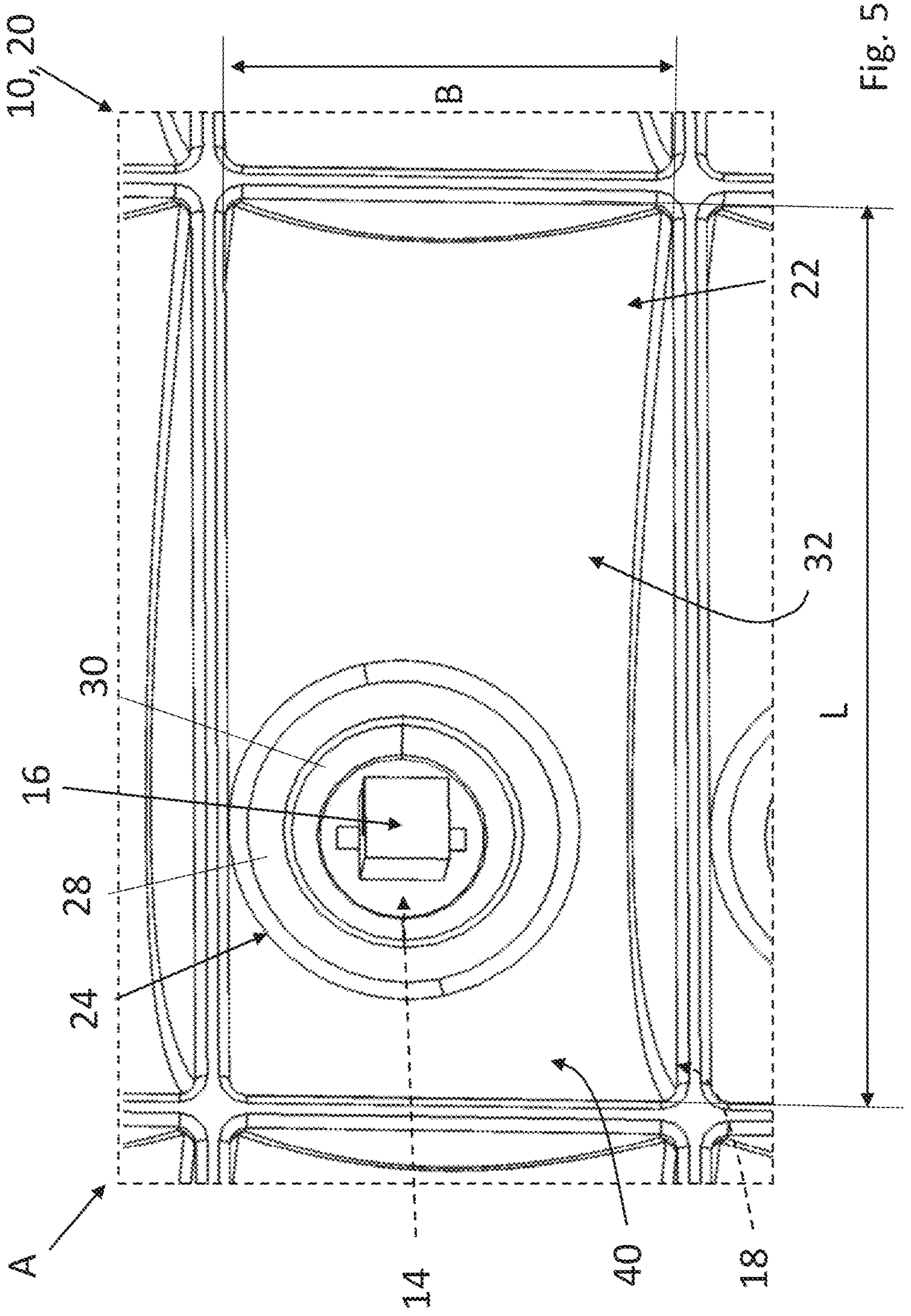
FIG. 5 shows a schematic illustration of a segment of the lighting device.

A lighting device 10 is shown in FIGS. 1 and 2, and sections of a lighting device 10 for a motor vehicle 12 are shown in FIGS. 3 to 5. FIGS. 3 and 4 show the section B from FIG. 1, and FIG. 5 shows the section A from FIG. 1. The lighting device 10 has a printed circuit board 14 populated with numerous light-emitting diodes 16, an optical panel 18, and a reflector element 20. The reflector element 20 is between the printed circuit board 14 and the optical panel 18, as can be seen in the longitudinal section in FIG. 2.

As shown in FIGS. 1 to 4, the reflector element 20 is divided into numerous segments 22. It can be seen that each light-emitting diode 16 is dedicated to a segment 22, such that light emitted from the light-emitting diodes 16 is reflected by the segments 22 of the reflector element 20 and passes through the optical panel 18.

The light-emitting diodes 16 emit light radially, such that light is also emitted laterally. To block or reflect the radial beams of the light-emitting diodes 16, each segment of the reflector element 20 has a reflector foot 24 that surrounds the respective light-emitting diode 16 and is in contact with the printed circuit board 14 at a contact surface 26 thereon. In the present embodiment, the reflector foot 24 and the segment of the reflector element 20 form an integral part that is bonded to the printed circuit board with an adhesive.

To be able to more easily position the reflector element 20, and to obtain a homogenous reflection, the reflector foot 24 is circular, as can be seen in section A in FIG. 5, and concentric to the respective light-emitting diode 16.

As a reinforcement, and to be able to vary the light emission behavior, the reflector foot 24 has a plateau 28 that is parallel to the printed circuit board 14. In this case, each reflector foot 24 on the segments 22 has a plateau, as can be seen in FIGS. 2 to 4. These plateaus 28 can differ from one another. In the embodiment shown in the drawings, the reflector feet 24 have notches 38, which reduce the amount of material that is need, and therefore the weight.

The second embodiment of the reflector foot 24, shown in FIG. 4, has an optical surface between the contact surface and the plateau 28, which reflects the light from the light-emitting diode. The optical surface 30 is at an angle $\alpha$ of 35° to 65° to the contact surface 26. This reflects the lower lateral light from the light-emitting diode toward the optical panel 18, as indicated by the beam path in FIG. 4. Consequently, less brightness is sacrificed, and the efficiency of the lighting device is increased.

To ensure that the lateral light from the light-emitting diode is reflected, the ratio of the height of the light-emitting diode to the height of the reflector foot 24 is between 1:1 and 1:3. By way of example, the ratio of the height of the light-emitting diode to the height of the reflector foot 24 in the exemplary embodiment in FIG. 3 is 1:1.5, and in the exemplary embodiment in FIG. 4, this ratio is 1:2. The height of the plateau 28 is 10% to 40% of the height of the reflector foot in this case.

As can be seen in FIG. 1 and FIG. 5, the segments have a rectangular segment surface 32. The segment surface 32 is dedicated to the optical panel 18. The reflection surface 40 of the segment 22 therefore transitions from a circular region of the reflector foot 24 to a rectangular segment surface 32. The shape of the reflection surface 40 can be parabolic, as can be seen in FIGS. 2 to 5. It can also form a paraboloid.

The rectangular segment surface 32 has a width B to length L ratio B/L of 1:1 to 1:4. This ratio B/L can vary over the lengths of the columns and rows in order to be able to generate the desired light signal.

For optimal results with regard to brightness, contrast, and color of the light signals, the reflector element 20, or the respective segments of the reflector element, is mirrored. In other embodiments, the reflector element 20, or its segments 22, can be sputtered, and they can also have a diffusing surface, in particular in the form of a pillow-shaped or striped structure.

The reflector element 20 can also have a diffractive diffusion structure, or a microstructure or scattering structure.

Figure 6:
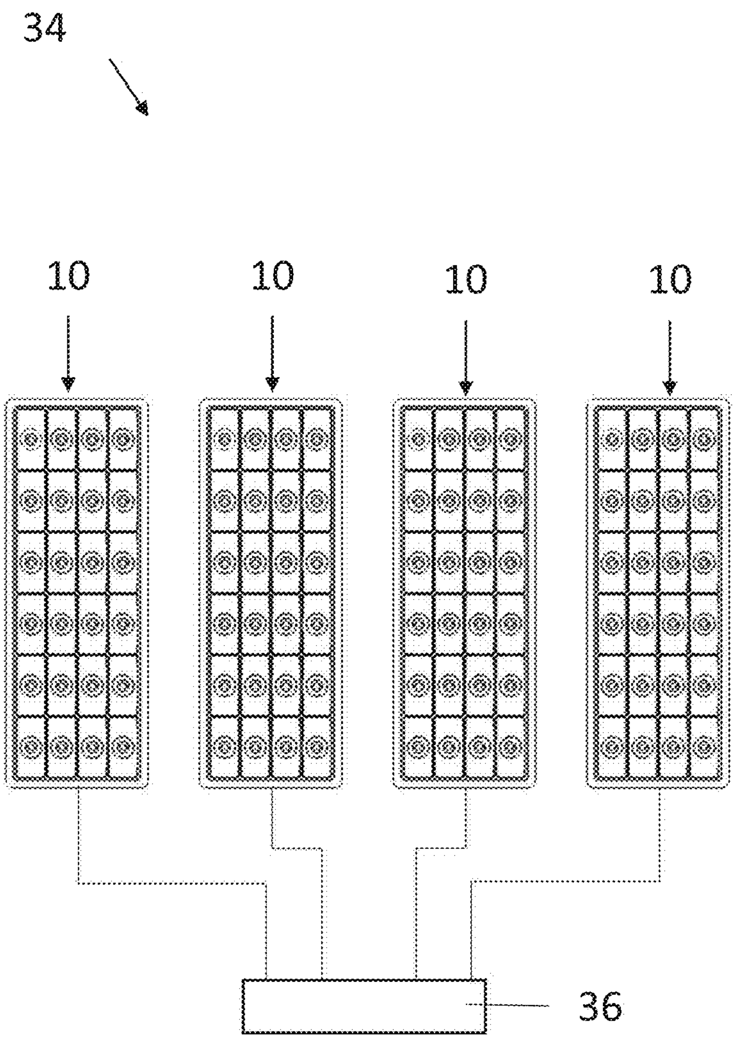
FIG. 6 shows a schematic illustration of a lighting system.

FIG. 6 shows a schematic illustration of a lighting system 34 that contains numerous lighting devices 10, a total of four in the present example, purely by way of example. The lighting devices 10 can be controlled by individual control units, or a single control unit 36, as shown in the drawing.

When light-emitting diodes 16 that cover the color spectrum (yellow, red, blue), the surface of the lighting device 10 can be subdivided such that the red region (red light-emitting diodes) is larger, and the yellow region (yellow light-emitting diodes) is smaller, for example. This makes it possible to obtain two lighting functions therewith, e.g. tail lights and turn signals, or three lighting functions, e.g. tail lights/brake lights and turn signals.

Figure 7:
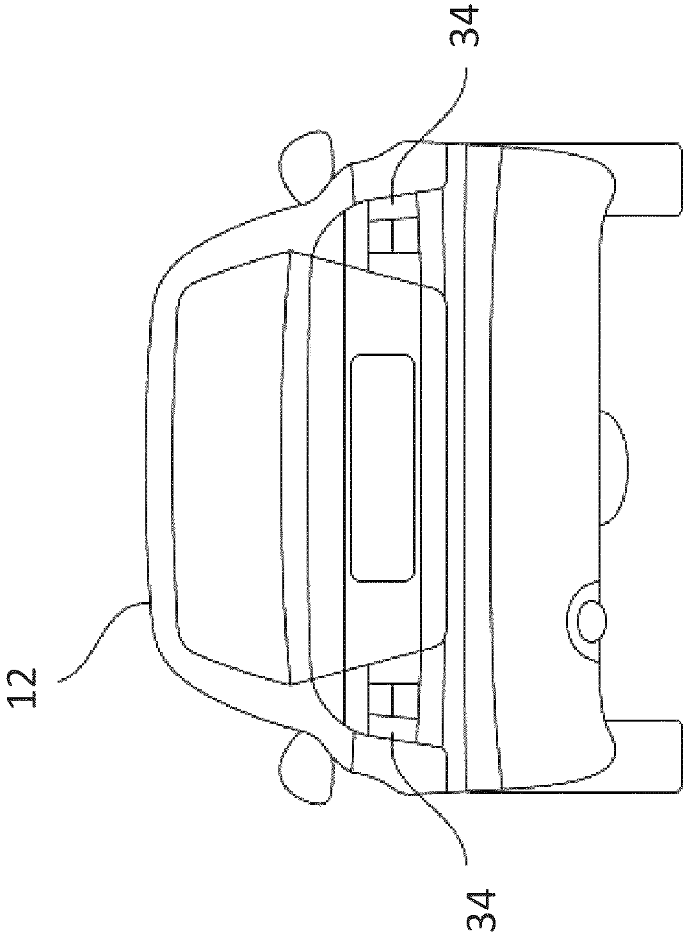
FIG. 7 shows a schematic illustration of a motor vehicle with a lighting system.

FIG. 7 shows a motor vehicle 12 according to an exemplary embodiment of the invention, from the rear. The motor vehicle 12 has the lighting system 34 described above, in the form of tail lights for the motor vehicle 12, such that it can display various identical or different light signatures, e.g. turn signals.

LIST OF REFERENCE SYMBOLS

10 lighting device
12 motor vehicle
14 printed circuit board
16 light-emitting diode
18 optical panel
20 reflector element
22 segments
24 reflector foot
26 contact surface
28 plateau
30 optical surface
32 segment surface
34 lighting system
36 control unit
38 notch
40 reflection surface
HL height of the light-emitting diode
HR height of the reflector foot
α angle
B width
L length

I claim:

1. A lighting device for a motor vehicle, the lighting device comprising:
- a printed circuit board populated with numerous light-emitting diodes;
- an optical panel; and
- a reflector element between the printed circuit board and the optical panel;
- wherein the reflector element is subdivided into numerous segments;
- wherein each light-emitting diode is dedicated to a said segment, such that the light from the light-emitting diodes is reflected by the segments of the reflector element and passes through the optical panel; and
- wherein each segment of the reflector element has a reflector foot that surrounds the respective light-emitting diode and contacts the printed circuit board at a contact surface, wherein a ratio of a height of the light-emitting diode to a height of the reflector foot is 1:1 to 1:3, the reflector foot including:
  - a plateau opposite the contact surface; and
  - an optical surface positioned between the plateau and the contact surface, the entire optical surface being configured to reflect the light from the light-emitting diode.

2. The lighting device according to claim 1, wherein the reflector foot forms a ring that is concentric to the respective light-emitting diode.

3. The lighting device according to claim 1, wherein the plateau is parallel to the printed circuit board.

4. The lighting device according to claim 1, wherein the optical surface between the contact surface and the plateau is at an oblique angle to the contact surface.

5. The lighting device according to claim 4, wherein the optical surface is at an angle ($\alpha$) of 35° to 65° to the contact surface.

6. The lighting device according to claim 1, wherein the reflector foot and the segment of the reflector element are formed as an integral part.

7. The lighting device according to claim 1, wherein a ratio of a height of the light-emitting diode to a height of the reflector foot is 1:1.5 to 1:2.5.

8. The lighting device according to claim 1, wherein the light-emitting diode emits light radially.

9. The lighting device according to claim 1, wherein the segments have a rectangular segment surface.

10. The lighting device according to claim 9, wherein a width (B) to length (L) ratio (B/L) of the rectangular segment surface is 1:1 to 1:4.

11. The lighting device according to claim 1, wherein the reflector element is mirrored and/or sputtered, and/or is a diffusing lens.

12. The lighting device according to claim 11, wherein the reflector element has pillow-shaped or striped structures.

13. The lighting device according to claim 1, wherein the reflector element has a diffractive diffusion structure or microstructure, or a scattering structure.

14. A lighting system for a motor vehicle, the lighting system comprising:
- a lighting device according to claim 1, and
- a control unit for a light signature display obtained with the lighting device.

15. The lighting system according to claim 14, wherein the lighting system contains numerous lighting devices according to claim 1, and the control unit is configured to display a light signature obtained with at least two of the lighting devices.

16. A motor vehicle that has a lighting device according to claim 1.

* * * * *